(12) United States Patent
Minges

(10) Patent No.: US 8,087,195 B2
(45) Date of Patent: Jan. 3, 2012

(54) TREE MOUNTED APPARATUS

(75) Inventor: James C. Minges, Canandaigua, NY (US)

(73) Assignee: Duffy's Hunting Products, Inc., Canandaigua, NY (US)

( * ) Notice: Subject to any disclaimer, the term of this patent is extended or adjusted under 35 U.S.C. 154(b) by 167 days.

(21) Appl. No.: 12/478,961

(22) Filed: Jun. 5, 2009

(65) Prior Publication Data

US 2010/0018102 A1    Jan. 28, 2010

Related U.S. Application Data

(60) Provisional application No. 61/083,412, filed on Jul. 24, 2008.

(51) Int. Cl.
*F41C 27/00* (2006.01)
*A47B 96/06* (2006.01)
*G09F 7/18* (2006.01)

(52) U.S. Cl. .......................................... 42/94; 248/230.8

(58) Field of Classification Search ... 42/94; 248/218.4, 248/219.4; 52/36; 34/192; 62/251; 211/119, 211/134; 24/136 R
See application file for complete search history.

(56) References Cited

U.S. PATENT DOCUMENTS

| | | | | | |
|---|---|---|---|---|---|
| 46,365 | A | * | 2/1865 | Kinman | 42/94 |
| 281,338 | A | * | 7/1883 | Butler | 42/94 |
| 1,406,827 | A | * | 2/1922 | Dumas | 42/94 |
| 1,469,285 | A | * | 10/1923 | Thompson | 224/270 |
| 1,926,836 | A | * | 9/1933 | Corlett | 242/118.4 |
| 3,022,898 | A | * | 2/1962 | Loeb | 211/64 |
| 3,197,830 | A | * | 8/1965 | Hoadley | 24/16 PB |
| 3,200,528 | A | * | 8/1965 | Christensen | 42/94 |
| 3,310,623 | A | * | 3/1967 | Vaughan | 206/702 |
| 3,333,681 | A | * | 8/1967 | Spohr et al. | 206/351 |
| 3,636,894 | A | * | 1/1972 | Hage | 108/156 |
| 3,845,575 | A | * | 11/1974 | Boden | 36/50.1 |
| 3,953,144 | A | * | 4/1976 | Boden | 403/374.2 |
| 3,963,156 | A | * | 6/1976 | Perrin | 224/268 |
| 4,156,574 | A | * | 5/1979 | Boden | 403/211 |
| 4,205,478 | A | * | 6/1980 | Emory | 43/44.85 |
| 4,208,770 | A | * | 6/1980 | Takada | 24/136 K |
| 4,266,748 | A | * | 5/1981 | Dalton | 248/425 |
| 4,288,891 | A | * | 9/1981 | Boden | 24/115 G |
| 4,328,605 | A | * | 5/1982 | Hutchison et al. | 24/115 G |

(Continued)

FOREIGN PATENT DOCUMENTS

DE        3204082 A1 *  8/1983 ........................ 42/94

(Continued)

OTHER PUBLICATIONS

Little Sure Shot Gun Rests; Big Mouth ; thunderboltcustoms.com; Thunderbolt Customs, Inc.613 South Lincoln Blvd., Centralia, IL 62801, (Date:2008).

*Primary Examiner* — Michael Carone
*Assistant Examiner* — Joshua Freeman
(74) *Attorney, Agent, or Firm* — Basch & Nickerson LLP

(57) ABSTRACT

A portable apparatus, removably attached to an existing vertical support or structure, such as a tree, for providing a firearm rest or suspending articles above the ground. The apparatus may include associated vertical and a horizontal members, where the vertical member is secured to the tree using a securing device such as a cord and binder arrangement. The multi-purpose apparatus is supports a firearm such as a rifle.

16 Claims, 8 Drawing Sheets

U.S. PATENT DOCUMENTS

| | | | | |
|---|---|---|---|---|
| 4,453,292 A * | 6/1984 | Bakker | | 24/115 G |
| 4,506,417 A * | 3/1985 | Hara | | 24/115 G |
| 4,506,466 A * | 3/1985 | Hall | | 42/94 |
| 4,529,240 A | 7/1985 | Engel | | 294/141 |
| 4,614,007 A * | 9/1986 | Else | | 24/136 K |
| 4,615,532 A * | 10/1986 | Biller et al. | | 279/32 |
| 4,622,723 A * | 11/1986 | Krauss | | 24/115 G |
| 4,675,948 A * | 6/1987 | Bengtsson | | 24/115 G |
| 4,722,501 A * | 2/1988 | Ruhl | | 248/218.4 |
| 4,887,337 A * | 12/1989 | Bateman | | 24/136 R |
| 4,991,265 A * | 2/1991 | Campbell et al. | | 24/16 PB |
| 5,020,192 A * | 6/1991 | Gerlach | | 24/136 R |
| 5,082,232 A * | 1/1992 | Wilson | | 248/551 |
| 5,205,523 A * | 4/1993 | Jones | | 248/218.4 |
| 5,207,171 A * | 5/1993 | Westwood, III | | 114/218 |
| 5,208,950 A * | 5/1993 | Merritt | | 24/115 H |
| 5,263,202 A * | 11/1993 | Siberell | | 2/336 |
| 5,263,232 A * | 11/1993 | Matoba | | 24/115 G |
| 5,263,675 A * | 11/1993 | Roberts et al. | | 248/219.4 |
| 5,290,019 A * | 3/1994 | Beyers | | 269/43 |
| 5,292,014 A * | 3/1994 | Lelong | | 211/85.23 |
| 5,301,911 A * | 4/1994 | Beauchemin | | 248/218.4 |
| 5,337,996 A * | 8/1994 | Kalish | | 248/460 |
| 5,361,461 A * | 11/1994 | Anscher | | 24/115 G |
| 5,368,281 A * | 11/1994 | Skyba | | 254/391 |
| 5,427,344 A * | 6/1995 | Beauchemin | | 248/218.4 |
| 5,491,920 A * | 2/1996 | McCullers | | 42/94 |
| 5,596,830 A * | 1/1997 | Morgan | | 42/94 |
| 5,685,103 A * | 11/1997 | Wiggins | | 42/94 |
| 5,692,272 A * | 12/1997 | Woods | | 24/459 |
| 5,703,317 A * | 12/1997 | Levilly et al. | | 89/37.03 |
| 5,723,808 A * | 3/1998 | Devall | | 89/37.04 |
| 5,769,372 A * | 6/1998 | Klosterman | | 248/219.4 |
| 5,857,651 A * | 1/1999 | Kunevicius | | 248/230.8 |
| 6,029,386 A * | 2/2000 | Globig | | 42/94 |
| 6,059,240 A * | 5/2000 | Gorsuch | | 248/219.4 |
| 6,065,722 A * | 5/2000 | LeVasseur et al. | | 248/230.8 |
| 6,196,511 B1 * | 3/2001 | Beauchemin | | 248/328 |
| 6,243,979 B1 * | 6/2001 | Seats et al. | | 42/94 |
| 6,266,910 B1 * | 7/2001 | Horine | | 42/94 |
| 6,276,087 B1 * | 8/2001 | Singletary | | 42/94 |
| 6,292,984 B1 * | 9/2001 | Nelson | | 24/134 R |
| 6,339,865 B1 * | 1/2002 | Takahashi et al. | | 24/136 R |
| 6,363,585 B1 * | 4/2002 | Gustafson et al. | | 24/115 K |
| 6,375,052 B2 * | 4/2002 | Keton | | 224/222 |
| 6,401,309 B1 * | 6/2002 | Yang | | 24/130 |
| 6,508,446 B1 * | 1/2003 | Addison et al. | | 248/218.4 |
| 6,581,891 B1 * | 6/2003 | Byrd | | 248/219.4 |
| 6,694,661 B1 * | 2/2004 | Langford | | 42/94 |
| 6,726,163 B2 * | 4/2004 | Eppard et al. | | 248/219.4 |
| 6,948,690 B1 * | 9/2005 | Sandel | | 248/218.4 |
| 6,951,072 B2 * | 10/2005 | Schurtenberger | | 42/94 |
| 7,032,276 B1 * | 4/2006 | Olson | | 24/171 |
| 7,454,859 B2 * | 11/2008 | Buckner | | 42/94 |
| 7,493,719 B2 * | 2/2009 | Lackey | | 42/94 |
| 7,565,762 B2 * | 7/2009 | Lackey | | 42/94 |
| 7,770,319 B2 * | 8/2010 | McDonald | | 42/94 |
| 2002/0088163 A1 * | 7/2002 | Young et al. | | 42/94 |
| 2004/0216351 A1 * | 11/2004 | Eppard et al. | | 42/94 |
| 2005/0246935 A1 * | 11/2005 | Northrup | | 42/94 |
| 2006/0231707 A1 * | 10/2006 | Schrot | | 248/218.4 |
| 2006/0249640 A1 * | 11/2006 | Hanson | | 248/214 |
| 2007/0000163 A1 | 1/2007 | Buckner | | |
| 2007/0175370 A1 * | 8/2007 | Paquin | | 108/152 |
| 2008/0172919 A1 | 7/2008 | Lackey | | |
| 2009/0064560 A1 * | 3/2009 | Saunders, III | | 42/94 |
| 2009/0084479 A1 * | 4/2009 | McCauley et al. | | 152/219 |
| 2010/0251592 A1 * | 10/2010 | Otto | | 42/94 |

FOREIGN PATENT DOCUMENTS

FR    2659206 A  *  9/1991

* cited by examiner

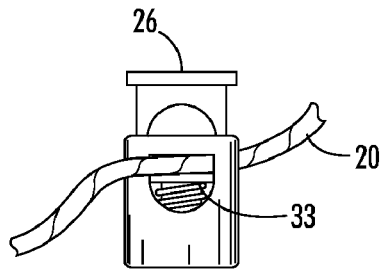
FIG. 6A
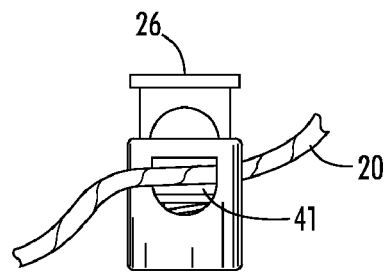
FIG. 6B
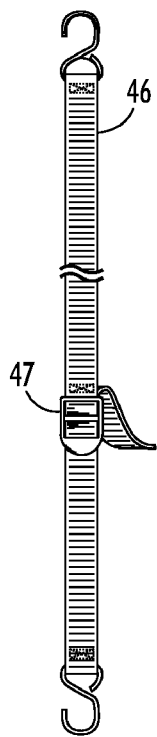     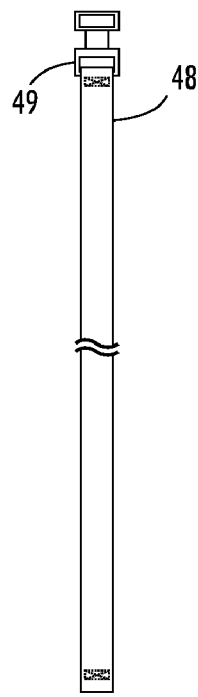     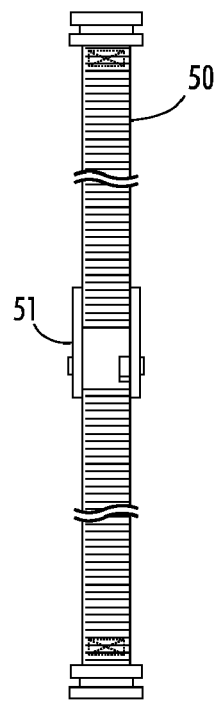     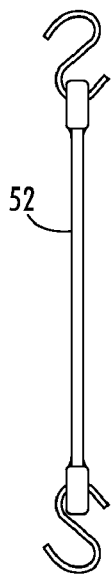
FIG. 7A       FIG. 7B       FIG. 7C       FIG. 7D

TREE MOUNTED APPARATUS

This application claims priority benefit under 35 USC 119(e) from U.S. Provisional Patent Application No. 61/083,412, filed Jul. 24, 2008 by James C. Minges, which is hereby incorporated by reference in its entirety.

The disclosed apparatus and method are directed to providing a portable solution, which is easily attached and removed to a generally vertical support, such as a tree, to provide an environmentally responsible re-usable means to support or suspend an article from the ground. In other words, the apparatus may be used to provide a portable convenient "hook" in the woods for safely securing and supporting articles above the ground, and in one embodiment to provide a rest for a firearm used in hunting or similar activities.

BACKGROUND AND SUMMARY

The disclosed embodiments primarily relate to a support used to position a firearm (e.g. rifle, shotgun, pistol) in conjunction with a vertical member, such as a tree or post. The positioning of a firearm, without supplemental support, is difficult, particularly when hunters must remain motionless, yet prepared to take a shot at a target over an extended period of time. In order to fire accurately and safely, a hunter must be able to hold a firearm very still, particularly when firing at long range, where only a slight movement of the firearm results in a significant divergence of the bullet. The disclosed apparatus provides a stable horizontal surface on which a hunter may rest a firearm in order to steady it in a generally horizontal position, thereby minimizing movement of the firearm prior to, and during, its discharge, thus improving safety and accuracy.

More specifically, a hunter can generally spend hours waiting in anticipation of approaching game. During this idle time, there is a need for the hunter to be holding the firearm in a firing position because there is a risk that the disturbance from shouldering the firearm could possibly spook the game. Consequently there is a requirement to provide a tree mounted holder or support in order to relieve the physical strain of supporting the firearm in a fire ready stance over an extended period. Additionally, there are times when the hunter may wish to have a hand free by resting the firearm on the support, so that a sounding device, to lure the game into range, may be used. Unfortunately, it is all too convenient to use a living tree as a gun rest, often by first pounding a spike or bracket into the tree bark. While practical for the immediate purpose, a spike penetrates and damages the bark of a tree, providing a point of entry for insects and disease. Additionally, when left in the tree the nail can pose a dangerous protrusion on which people can be injured. Lastly, the tree grows about the iron from the nail and when the lumber is later harvested the embedded nail can damage the teeth on a chainsaw blade or cause injury to the saw operator. Therefore, the disclosed embodiments are directed to a tree mounted apparatus that provides a firearm rest or holder for hanging items above the ground—an apparatus that requires no alterations, and does not cause damage to the tree or other supporting structures to which it may be removably attached. The use of a flexible member (e.g. rope, strap, band, cord, belt) allows for a compressive force to be applied about the periphery of the tree, which supports the apparatus due to the tensile force applied to the flexible member.

Bench-style gun rests consist of an adjustable barrel prop that provides support for the forearm and stock of the firearm as well. However, it is generally not practical to trek through the woods carrying a bench-style shooting rest given the weight and unwieldy nature of such a device. Bipod and monopod style shooting rests are also known, but again are difficult to use used adjacent to a tree, and are not always practical for standing in the open for extended periods of time. Such devices, in order to be light enough to carry, tend to be flimsy and not useful in some situations. A tree stand will often include a gun supporting feature, however tree stands may significantly restrict mobility within the hunt area.

While a tree mounted apparatus is primarily used for supporting a firearm, it is further contemplated that the disclosed apparatus may be used in a plurality of camping, hunting and/or fishing uses, including a holder for a battery-powered lantern, clothes, a bucket mount for sap collection or sink, a flag, or a general purpose "utility hook" to suspend articles above the ground, and various similar applications. In one embodiment the apparatus is designed to hold approximately 16 lbs, and would thus support various articles that fall below the weight limitation. It is, however, contemplated that heavier loads could be accommodated providing the strength of the bracket and tensile strength of the cord was suitable to support such a load, or a change in material and/or thickness of the components was used. However, the primary objective is to provide a lightweight and inexpensive means to hold various articles in the woods, specifically supporting a firearm. It is further contemplated that the disclosed apparatus may be employed as a device to drag game where the cord, in combination with a hook member may be used. Accordingly, the embodiments disclosed herein address an unmet need to provide an effective support for a firearm, in a ready position, when hunting, as well as a means to hold or hang various outdoor articles An object of the disclosed device is to provide a tree mounted holder that is lightweight, versatile and configured so as to be easily installed and removed, but compact for transporting.

A further objective is to encourage the use and re-use of an environmentally friendly bracket using a tree as a support.

A further object of the disclosed holder is to provide a hunter with a firearm rest that allows for unhindered barrel motion when aiming the firearm.

A further objective is to provide an apparatus that blends in with the surrounding environment, such as a camouflage pattern.

In accordance with an additional aspect of the disclosed apparatus, it is intended to provide a strap and handle arrangement to be used to assist in dragging game or other items (e.g., branches for firewood).

And yet another objective is to provide a general purpose portable bracket for hanging articles, such as when camping.

In accordance with an aspect of the disclosed embodiments, there is provided a portable apparatus, comprising: a vertical member adapted to be attached to a pre-existing vertical support; a horizontal member operatively connected to and extending from said vertical member, so as to provide a planar surface to support an object resting on said planar surface; a flexible member, attached to said vertical member and encircling the vertical support; and a securing device, in combination with said flexible member, for removably securing the apparatus to the support.

In accordance with yet another aspect of the disclosed embodiments, there is provided a portable firearm rest, utilizing an existing vertical support, comprising: a vertical member adapted to be attached to the support; a horizontal member operatively connected to and extending from said vertical member, so as to provide a surface to support a rifle, shotgun, pistol or other firearm; a flexible member, attached to said vertical member and encircling the vertical support;

and a securing device, in combination with said flexible member, for removably securing said rest to the support.

Other and further objects, features and advantages will be evident from a reading of the following specification and by reference to the accompanying drawings forming a part thereof, wherein the examples of the presently preferred embodiments are given for the purposes of disclosure.

BRIEF DESCRIPTION OF THE DRAWINGS

FIGS. 6A-B are isometric views of an exemplary cord toggle;

FIGS. 7A-D are views depicting various alternative strap configurations;

The various embodiments described herein are not intended to limit the claimed invention to those embodiments described. On the contrary, the intent is to cover all alternatives, modifications and equivalents as may be included within the spirit and scope of disclosure and the apparatus as defined by the appended claims.

DETAILED DESCRIPTION

Figure 1:
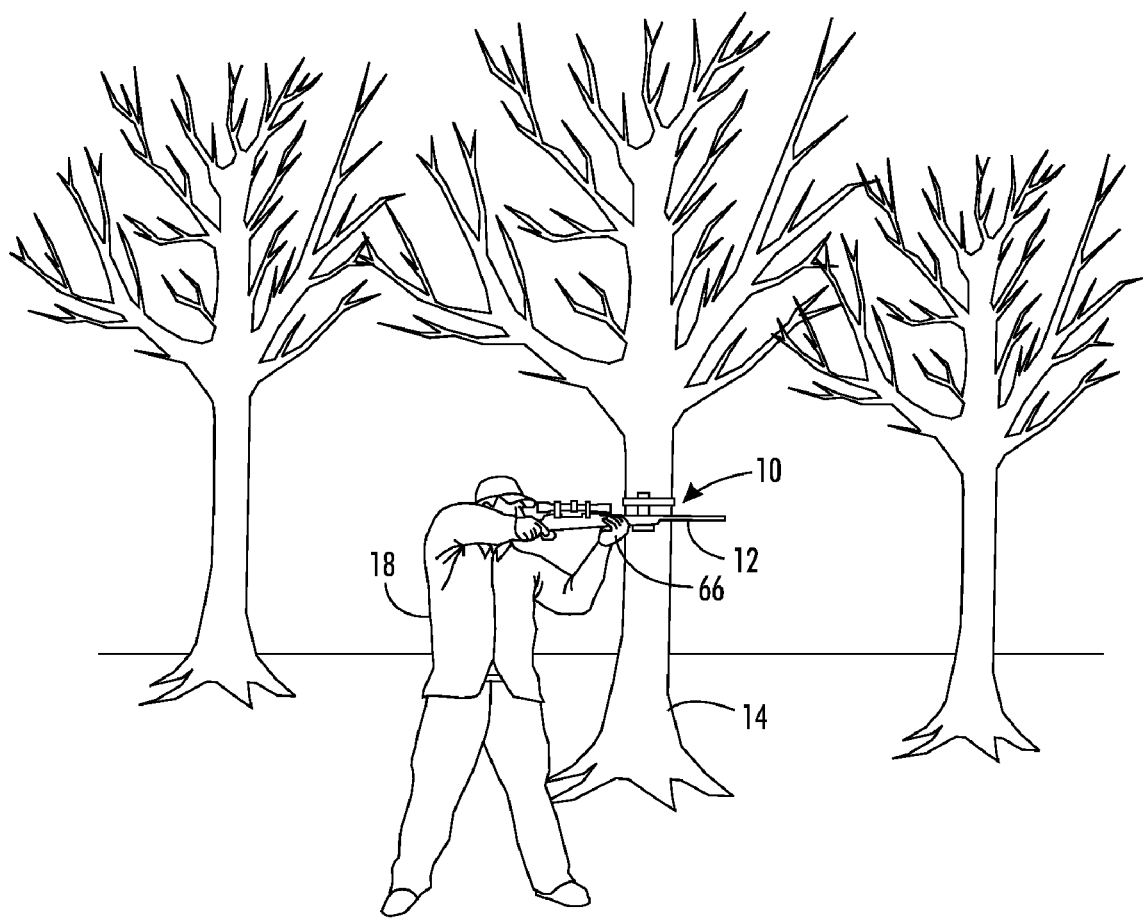
FIG. 1 is a view of the portable apparatus in use as a tree-mounted firearm rest.

Referring now to the drawings where the showings are for the purpose of illustrating a preferred embodiment of the apparatus and not for limiting same, FIG. 1 illustrates hunter 18 in an upright or standing shooting position using apparatus 10 as a tree mounted firearm rest or stabilizer to carry a substantial portion of the weight of rifle 12. As best seen in this figure, tree mounted holder 10 may be positioned at any convenient height to accommodate the size and stance of hunter 18. The tree or support may also be of any size, shape or diameter. Additionally (not shown) hunter 18 may be seated on a stool or in a position behind tree 14, so to be comfortable, as well as out of sight, from approaching game. In actual practice the hand 66 of hunter 18 likely rests directly on horizontal member 24 and underneath rifle 12.

Figure 2:
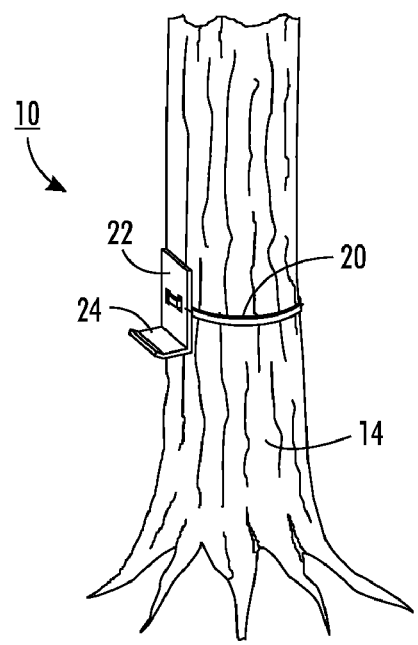
FIG. 2 is an isometric view of the apparatus attached to a tree.

The system shown in FIG. 2 comprises three principle elements; vertical member 22, horizontal member 24 and a flexible member 20 such as cinchable cord including a cinching device attached thereto. Vertical member 22 and horizontal member 24, respectively are either formed as a single piece or otherwise joined together at first angle 27 (see FIG. 8). Angle 27 is, in one embodiment, equal to approximately 45-90 degrees, and may be fixed by the manner in which member 22 is joined to member 24, for example by welding, bending, or a single molded member. In the alternative, a hinge or similar coupling member may be employed to couple or joint the members 22 and 24 so as to permit adjustment of the orientation of one member relative to the other, as will be discussed later.

In one use, as depicted in FIG. 1, a hunter 18 attaches apparatus 10 to tree 14 in preparation for resting or aiming firearm 12 toward a target, or in the alternative to hold various articles off the ground. Additionally, it may be advantageous if the cord and apparatus present a camouflage appearance so as to blend with the tree or surrounding foliage.

Figure 3:
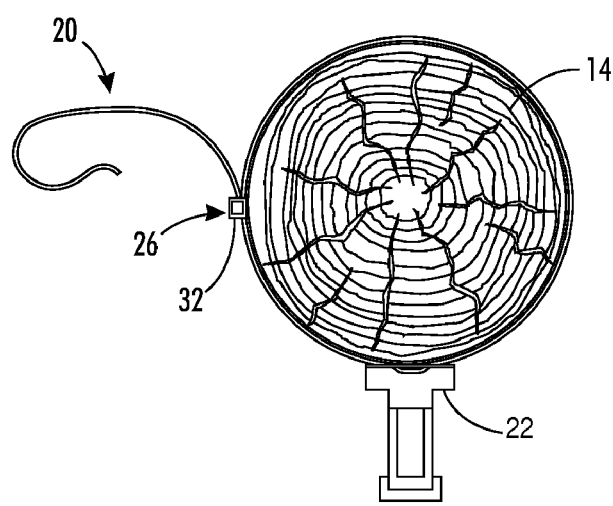
FIG. 3 is a cross sectional top view of the apparatus attached to a tree.
Figure 11:
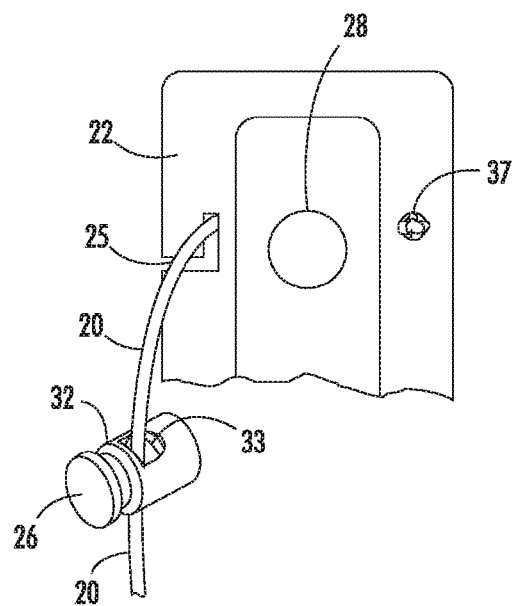
FIG. 11 is an enlarged view of the cord connection region of FIG. 9 with an exemplary cord.
Figure 12:
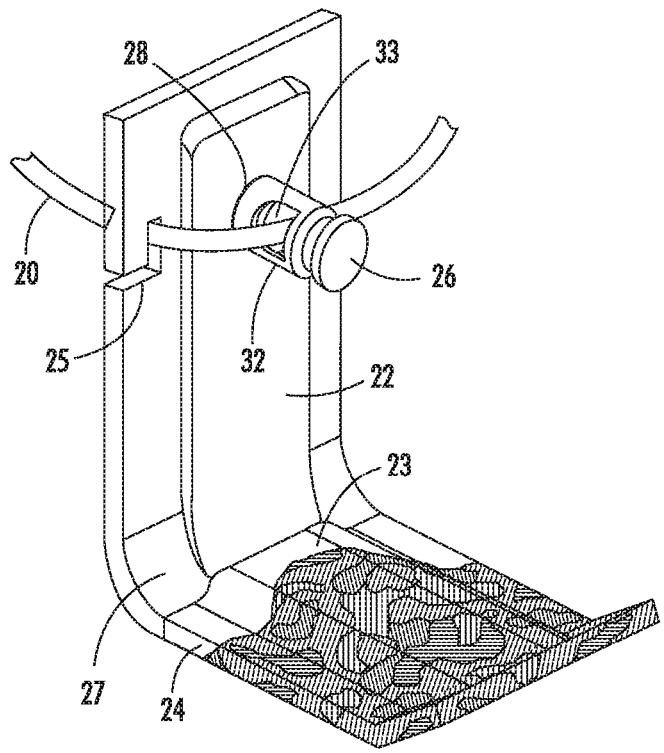
FIG. 12 is a further view of FIG. 11 detailing a cinched cord in use.

With reference now to FIGS. 2 and 3, in the illustrated embodiment an attachment means, for example cord 20, is cinched about tree 14 in order to securely retain apparatus 10 in direct contact with tree 14. Notably, the tension developed within cord 20, and the resulting radial force against tree 14, is sufficient to maintain the position of apparatus 10, without the use of any invasive fasteners, barbs or spikes that inevitably damage the tree 14. The tension in cord 20 is created by pulling cord 20 through a toggle 32 (e.g., tensioner or cord stop) or similar adjustable tensioner, as best viewed in FIG. 6, which pinches cord 20, thereby causing an adequate binding force to prevent cord 20 from loosening or slipping and moving downward on the trunk of tree 14. In one embodiment, as depicted in FIGS. 9-12 for example, a first end of cord 20 is secured to vertical member 22 with a knot 37 in hole 31 and drawn taught around the tree. The cord is then passed through slot 25 in the vertical member and the tensioner, toggle 32, as illustrated in FIGS. 11 and 12, is subsequently placed within hole 28 to further anchor cord 20. In an alternative embodiment, as depicted in FIGS. 3 and 4, the tensioner, such as cord stop or toggle 32, may be used to hold the tension in the cord, but is not directly attached to the vertical member—hence toggle 32 secures the apparatus to the tree by looping around the tree and holding tension in the cord 20.

Referring also to FIGS. 6A and 6B, in order to release the cord tension plunger 26 on the tensioner 32 is displaced and cord 20 is then free to move. The cord securing mechanism may be any device having the intended purpose of holding a flexible member in tension and subsequently releasing the tension when deactivated or disengaged. Cord 20 is, in one embodiment, essentially a draw string that may be made out of a solid, twisted or braided flexible material such as nylon, polypropylene, polyesters, polyethylene, cotton, or any hybrid combination thereof that provides for a limited modulus of elasticity. Natural fibers such as hemp, jute, or sisal may be less desirable due to their tendency to fray when used with a cinching device, such as toggle 32. Moreover, the cord may be in any number of styles including braided, woven, twisted, straps, etc. However, it is appreciated that a cord, as contrasted with a belt or strap, requires less room to store an equivalent length.

Figure 4A:
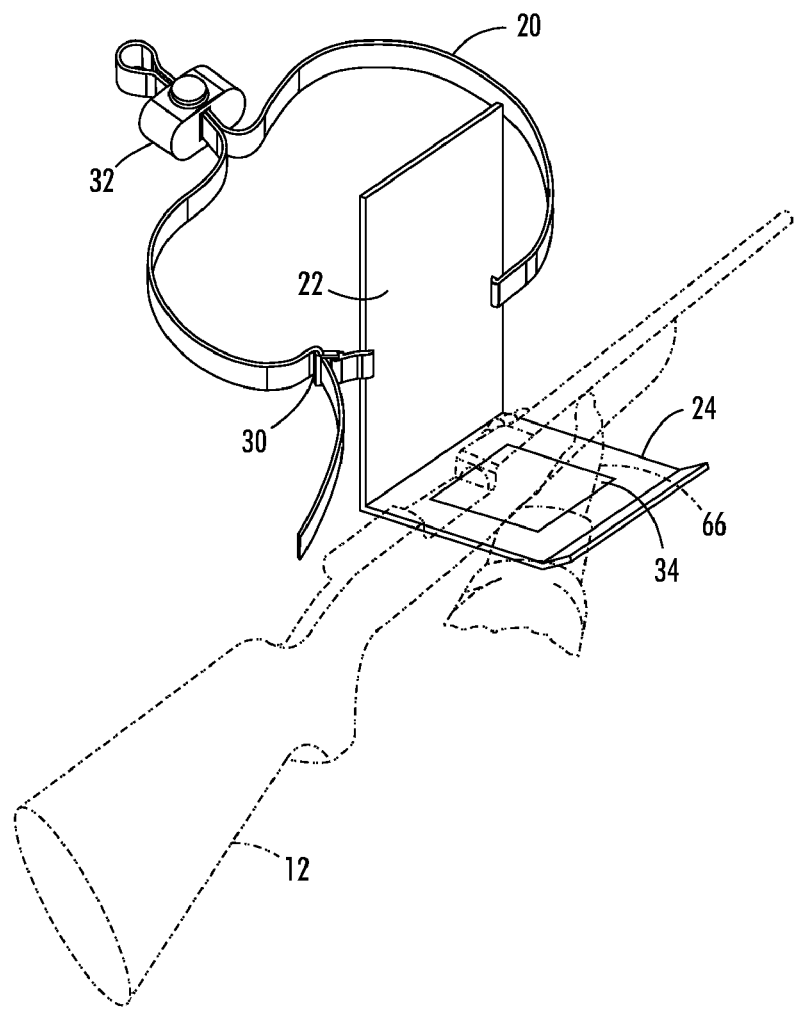
FIG. 4A is an isometric view of the, apparatus and a binding strap in a firearm rest embodiment having detachable members.
Figure 4B:
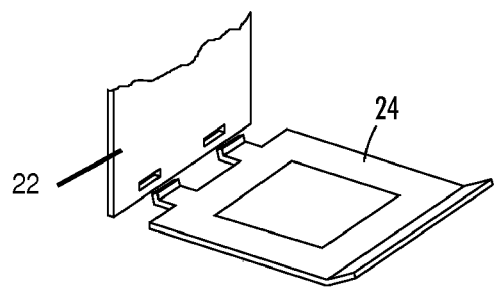
FIG. 4B is a view the apparatus of FIG. 4A in a multi-part embodiment where components are disassembled.

Turning to FIG. 4, a phantom rifle 12 is shown in the firing position and resting upon the horizontal member 24 of apparatus 10. While strap or cord 20 is shown looped through vertical member 22, it is also conceivable to connect either end of cord 20 to opposite edges of vertical member 22 using buckle 30, or similar securing device, where toggle 32 is then used to take up the slack in the cord or strap. Additionally, at one or both ends of cord 20 an adjustable buckle 30 serves to regulate the strap to a semi-fixed length to accommodate the customary diameter of a majority of trees, whereby buckle 30 is viewed as a macro adjustment, when compared to the micro adjustment and tension provided by toggle 32. Cord 20 is also designed to be removable for portability and may be employed for any number of alternative purposes where a strap is useful, for example in hauling game from the woods, tying down a tent, hanging an object from a tree limb, etc. Pad 34 is a resilient material that provides an ergonomic cushion to conform to the back or knuckles of the hunter's hand to relieve pressure points arising from extended contact with horizontal member 24.

Vertical member 22 and horizontal member 24 may be permanently joined together by welding, gluing or bending as previously noted. FIG. 4 depicts an alternative tab and slot design for joining the vertical and horizontal members, whereby the tabs of horizontal member 24 have a right angle bend so as to catch within the corresponding slots of vertical member 22. This interlocking configuration, as well as alternative engagement configurations or movable hinge elements, enables the two members to be separated from one another and/or folded into a minimum volume for transporting or storage. The material composition for vertical member 22 and horizontal member 24 may be a metal, but is more likely a polymer such as, polyurethane, polypropylene, polycarbonate, polyamides, and the like to provide a strong, lightweight holder. Furthermore when apparatus 10 is intended for uses such as hunting, the members and components may be surface coated or impregnated with varying colors to provide a camouflage appearance (e.g., camouflage shown on a portion of member 24 in FIG. 12). Furthermore, the use of thermoplastic polymers provides for a lightweight, corrosion resistant holder having a relatively low unit manufacturing cost. For example, the apparatus may be formed using various plastic forming and molding techniques (e.g., injection molding, thermo-forming, blow molding, etc.) that require few or no machining operations.

Figure 5A:
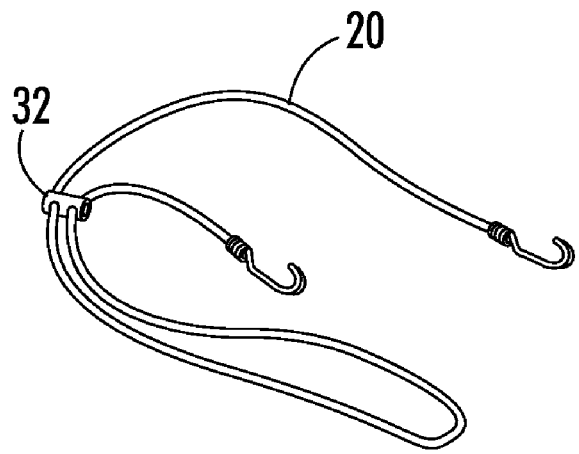
FIG. 5A is a view of a flexible cord for use with the apparatus.
Figure 5B:
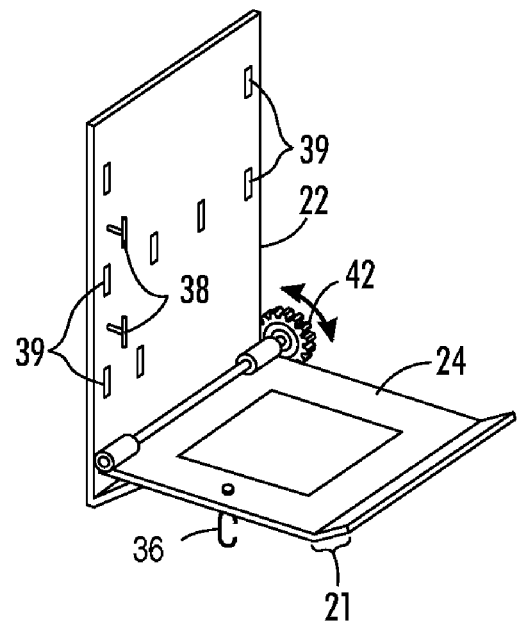
FIG. 5B is a view of an alternative embodiment of the apparatus.

Turning now to FIGS. 5A-B, one embodiment of cord 20 is shown separated from vertical member 22 and is available for use as a general purpose draw string having toggle 32 attached, and optionally may include hooks or similar fasteners on either end. FIG. 5B demonstrates an alternative embodiment of apparatus 10 whereby vertical member 22 and horizontal member 24 are pivotally connected in order to enhance the portability, as well as the utility of the apparatus. While the included angle is nominally limited to about 90 degrees, it is possible to reduce the angle into a more V-like position to provide an ergonometric positioning of the hand and improved grasp of the firearm. Knob 42 provides rotational resistance to seize the hinge or rotation point in a desired position that is less than 90-degrees relative to the vertical member. It is further contemplated that vertical member 22 and horizontal member 24 could be molded into a single part whereby the pivot point therebetween is a flexible joint, commonly referred to as a "living hinge." Horizontal member 24 further comprises angled section 21, inclined about 15-45 degrees at its distal end, forming a lip edge in order to keep the hand localized and prevent sliding off horizontal member 24.

As will be appreciated, the cord may be wound around the apparatus when folded, or in the alternative a compartment may be provided to stow the cord within. Additionally, when not attached to a tree, cord 20, in combination with holder 10, may be used for other purposes such as a handhold or grip to enable the game to be dragged. Additionally, an optional accessory hook 36 may be provided as a means to hang various articles while hunting, for example flashlight, binoculars, GPS receiver, canteen or the like.

With reference again to FIG. 5B, various cord attachment methods are considered. For example, studs 38 provide an anchor point for cord 20 having a loop at one end so as to be readily attached. Also, slots 39 may have a triangular shaped slot, to cause cord 20 to easily pass through one portion, having an area greater than the cord diameter, but when displaced into the opposite angle of slot 39, having an area less than the cord diameter, it is captured within slot 39 and may be secured within vertical member 22. Additionally slot 39 may take the form of a keyhole whereby cord 20 is elastic and has a knot placed on the end which passes through the hole and subsequently pulled and released into the slot portion of the keyhole. In yet another alternative embodiment slot 39 will accommodate the use of a hook or buckle that has been affixed to at least one end of cord 20. In the case where cord 20 is secured on both ends to vertical member 22, a buckle, clasp or possibly Velcro™ may be used to sustain a tension within the adjustable loop to secure vertical member 22 to tree 14. While only a single cord is depicted, there is no intention to limit the number of cords used to secure apparatus 10 to tree 14. Accordingly, a plurality of cords may be employed.

As specifically illustrated in FIGS. 6A-B, toggle 32 cinches cord 20 within opening 41 having a gripper therein. Those skilled in the art know of these devices as "cord toggle" retainers, for example those available from The Rain Shed, Corvallis, Oreg., Item #1802, as shown in FIGS. 6A-B, and are most commonly found in camping equipment (e.g., backpacks, tent and canopy tie downs, etc.), and clothing, especially outer wear. An alternative, not shown, is a toggle having a spherical-shaped body that functions in substantially the same manner, and also available from the above source under Item #1829.

Toggle 32 is comprised of two fundamental components, spring 33 and cinching plunger 26. Depressing plunger 26 causes an alignment of a hole in plunger 26 with a hole through the toggle body, thereby creating an opening through the toggle that allows cord 20 to freely pass through opening 41. Once plunger 26 is released, a shear force is developed from spring 33 and is applied to cord 20, causing the cord to bind within toggle 32, as seen in FIG. 6A for example. In actual practice cord 20 may be drawn tight about tree 14 and toggle 32 used to retain the cord at that length with sufficient tension to support the vertical member 22 of apparatus 10.

Now referring to FIGS. 7A-D, depicted are a variety of well known alternative flexible members such as cargo straps that may be used as alternatives to cord 20 to secure apparatus 10 to a vertical support such as tree 14 or post. Cam strap 50 uses a cam release buckle 51, whereby a knurled cam provides for unrestrained strap motion through the buckle in only one direction, whereas ratchet strap 46 relies on a ratchet take-up device 47 commonly found on cargo straps, Buckle strap 48 represents the traditional strap that is looped back through buckle 49 having at least two slots therein. Lastly, while bungee cord 52 is perhaps a consideration, the lack of adjustability as well as a limit to the amount of tension that is generated by the elastic material, confines the use on a broad range of tree diameters, however, it is conceivable that an elasticized cord and strap in combination may be advantageous to retain potential energy so as to take up the slack in some configurations, for example, in the case where cord 20 may yield and stretch under load.

Figure 8:
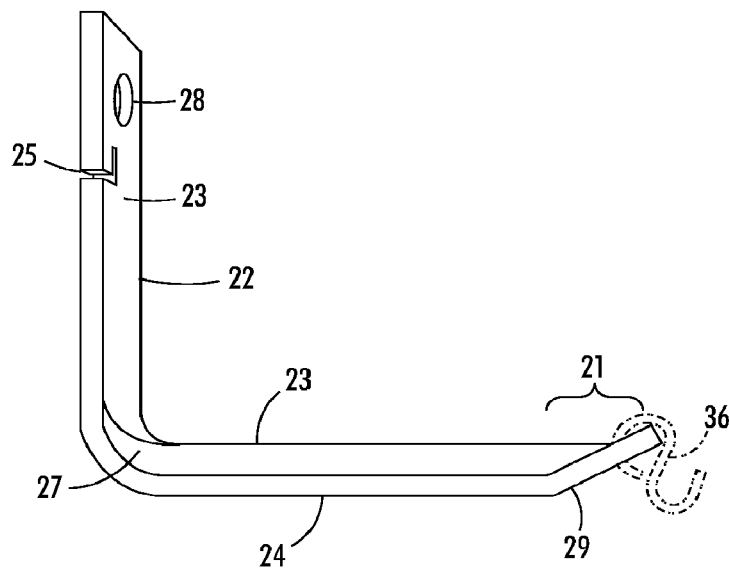
FIG. 8 is a side view of a single piece embodiment of the disclosed apparatus.
Figure 9:
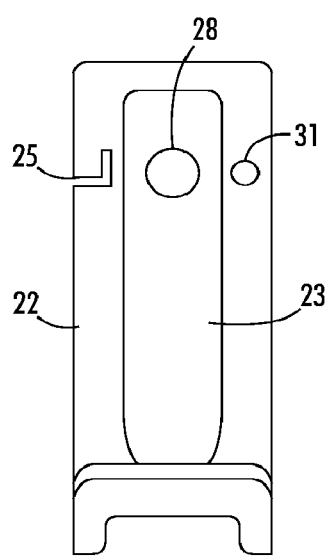
FIG. 9 is a front view of the apparatus of FIG. 8.
Figure 10:
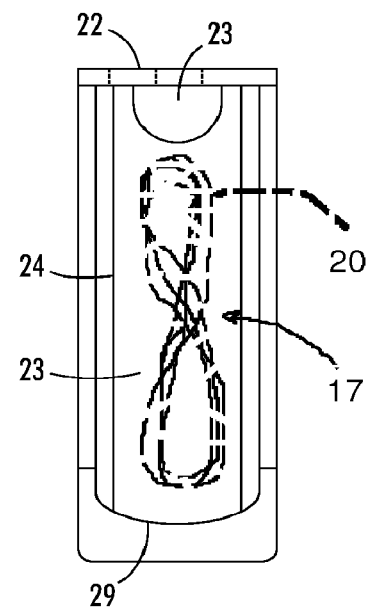
FIG. 10 is a top down view of the apparatus of FIG. 8.

Referring now to FIGS. 8-10, which serve to illustrate an embodiment of apparatus 10 that is molded to form a combination of vertical member 22 and horizontal member 24 in a single plastic component. The beam strength of vertical member 22 and horizontal member 24, as well as first angle 27 and angled section 29, is enhanced by means of reinforcing channel 23, formed along the longitudinal mid-section of apparatus 10. As noted in the front view of holder 10, in FIG. 9, and the top view of FIG. 10, channel 23 provides for the distribution of the bending moment into compressive and tension force components to provide the required rigidity to apparatus 10. The concave underside of channel 23 may further provide a "nest" 17 for a wound together cord 20 to be contained therein. The two members, 22 and 24 respectively are positioned at approximately a right angle and each member is approximately 1-2 inches in width, and from about 4-6 inches in length. Various thicknesses of material may be used, whereas the thickness is largely dependent upon the type of material and its physical characteristics. Hence for a metal member a thickness of about 0.0625-0.25 inches may be appropriate, however for a plastic member thicker materials in the range of 0.125-0.250 inches may be appropriate.

Flexible member or cord 20 is attached, as described herein, in various ways. As seen in FIG. 11, one end of cinch cord 20 is passed through aperture 31 (see FIG. 9) within vertical member 22 and secured therein with knot 37 at an end of cord 20. The opposite or free end of cord 20, having toggle 32 attached thereto, is placed around the tree at the height desired for the apparatus. Subsequently, cord 20 is placed into L-shaped slot 25 and positioned in the upper portion of the opening and drawn taught as plunger 26 of toggle 32 is depressed. Now, toggle 32 is positioned within opening 28, to further sustain the tension within cord 20 as seen in FIG. 12. Anchor cord 20 to eliminate slippage of cord 20 out of slot 25. And, the flexible cord member is continuously adjustable over at least a portion of its length to accommodate various tree or vertical support sizes. In one alternative, the toggle 32 may also be permanently attached to or molded into the vertical member 22, and the cord simply threaded and drawn therethrough to maintain the tension. In the embodiment depicted in FIG. 12, so as to release the cord tension toggle 32, plunger 26 is once again depressed and the cord is then free to relax and may be removed from hole 28 and L-shaped slot 25.

Again, various alternatives may be employed to accomplish the tensioning of cord 20, including various fasteners such as cable clamps, hooks, binders, tie wraps, and the like, each being suitable to provide an adequate binding force to prevent cord 20 from loosening or to limit the distance the rest slides on the tree when a force is applied to the horizontal member 24. Cord 20 is essentially a draw string that may be made out of a solid, twisted or braided flexible material such as nylon, polypropylene, polyesters, polyethylene, hybrid cotton, or any combination thereof that provides for a limited modulus of elasticity. Natural fibers such as hemp, jute, or sisal may be used, but may be less desirable due to their tendency to fray when used with toggle 32.

Figure 13:
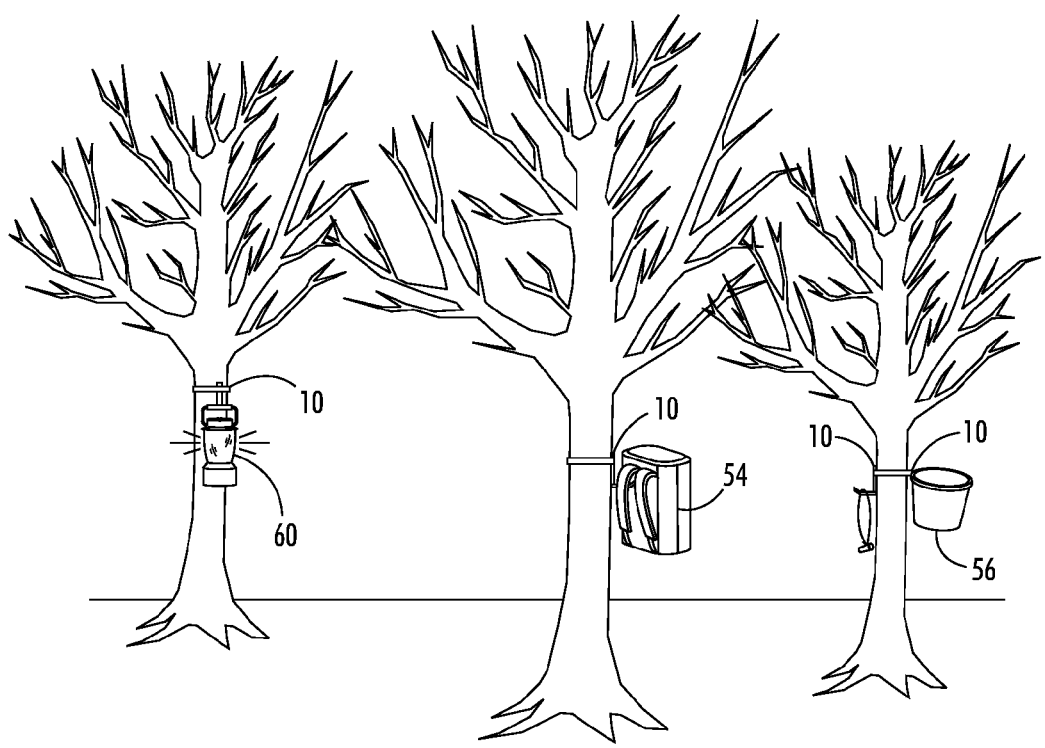
FIG. 13 is an environmental view of the apparatus in a plurality of uses.

FIG. 13 is an illustration intended to depict various exemplary uses for apparatus 10. The illustrated uses, include: a back pack holder 54, a battery powered lantern prop 60 and a sap bucket support 56. It is believed that articles on the order of up to about 16 pounds, and in alternative embodiments greater weights, may be securely held above the ground using apparatus 10. Additionally, it is contemplated that two or more apparatus 10, as shown on the right in FIG. 13, may be used with a common cord or strap to hold or suspend a plurality of items above the ground.

It will be appreciated that several of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A portable apparatus, comprising:
   a vertical member adapted to be attached to a pre-existing vertical support;
   a horizontal member extending from said vertical member, to provide a planar surface to support a firearm in a firing position on said planar surface;
   a flexible cord, a first end of said cord attached to said vertical member and encircling the vertical support; and
   a toggle securing device, operatively attached to said vertical member, in combination with said flexible cord, for removably securing the apparatus to the support, where a second end of said flexible cord passes through a slot within the vertical member and is cinched by said toggle securing device, said toggle securing device being further retained within a hole in said vertical member.

2. The portable apparatus as recited in claim 1, wherein said support is a tree.

3. The portable apparatus as recited in claim 1, wherein said horizontal member further includes a hook to suspend articles therefrom.

4. The portable apparatus of claim 1, wherein at least one of said vertical and horizontal members are constructed from a plastic material.

5. The portable apparatus of claim 1, wherein at least one of said vertical and horizontal members are constructed from a metallic material.

6. The portable apparatus of claim 1, wherein the outer surface of said vertical and horizontal members are camouflaged in appearance.

7. The portable apparatus of claim 1, wherein said vertical and horizontal members are rotationally connected.

8. The portable apparatus of claim 1, wherein said vertical and horizontal members are removably engaged.

9. The portable apparatus of claim 1, wherein said horizontal member includes compliant padding associated therewith to rest a hand thereon, said hand, in turn, supporting the firearm in the firing position.

10. The portable apparatus as recited in claim 1, wherein at least one member includes a longitudinal channel.

11. The portable apparatus as recited in claim 10, wherein said longitudinal channel is of sufficient size to receive the flexible cord therein.

12. The portable apparatus of claim 1, wherein said flexible cord is continuously adjustable over its entire length.

13. A portable firearm rest, utilizing an existing tree for a vertical support, comprising:
   a molded vertical member adapted to be attached to the tree;
   a horizontal member commonly molded with and extending from said vertical member, to provide a surface to support a firearm resting thereon in a firing position;
   a flexible cord, a first end of said cord attached to an opening in said vertical member, a second end of said cord encircling the tree and passing through a slot in said vertical member;
   a toggle securing device, retained within a hole in the vertical member, in combination with said second end of said flexible cord inserted through and constrained within said retained toggle, for removably securing said rest to the tree; and
   a longitudinal reinforcing channel formed within at least one of the vertical and horizontal members, said reinforcing channel providing a region into which said flexible cord is placed when not in use.

14. The portable firearm rest as recited in claim 13, wherein said horizontal member further includes a hook to suspend articles therefrom.

15. The portable firearm rest of claim 13, wherein at least one of said vertical and horizontal members are constructed from a plastic material.

16. The portable firearm rest as recited in claim 13, wherein said flexible cord is continuously adjustable over at least a portion of its length.

\* \* \* \* \*

UNITED STATES PATENT AND TRADEMARK OFFICE
CERTIFICATE OF CORRECTION

| | | |
|---|---|---|
| PATENT NO. | : 8,087,195 B2 | Page 1 of 1 |
| APPLICATION NO. | : 12/478961 | |
| DATED | : January 3, 2012 | |
| INVENTOR(S) | : James C. Minges | |

It is certified that error appears in the above-identified patent and that said Letters Patent is hereby corrected as shown below:

Title Pg, Item (73) Assignee:

The Assignee of the Patent is James C. Minges, 3985 Furman Road, Canandaigua, NY 14424.

Signed and Sealed this

Seventh Day of February, 2012

David J. Kappos
*Director of the United States Patent and Trademark Office*